United States Patent [19]

Ejiri

[11] Patent Number: 5,239,385
[45] Date of Patent: Aug. 24, 1993

[54] COMMUNICATION APPARATUS

[75] Inventor: Seishi Ejiri, Yokohama, Japan

[73] Assignee: Canon Kabushiki Kaisha, Tokyo, Japan

[21] Appl. No.: 289,014

[22] Filed: Dec. 23, 1988

[30] Foreign Application Priority Data

Dec. 28, 1987 [JP] Japan .................... 62-336355

[51] Int. Cl.$^5$ .................. H04N 1/00; H04M 11/00
[52] U.S. Cl. ............................. 358/434; 358/440; 379/100
[58] Field of Search ............ 358/400, 404, 434, 435, 358/436, 437, 438, 439, 440, 443, 448, 474, 476; 379/100, 188, 190, 199, 127

[56] References Cited

U.S. PATENT DOCUMENTS 4,791,664 12/1988 Lutz et al. ................ 379/188
4,827,501 5/1989 Hansen .................... 379/199

FOREIGN PATENT DOCUMENTS 59-128867 7/1984 Japan .................... 358/440
60-132457 7/1985 Japan .................... 379/100

Primary Examiner—Edward L. Coles, Sr.
Assistant Examiner—Thomas D. Lee
Attorney, Agent, or Firm—Fitzpatrick, Cella, Harper & Scinto

[57] ABSTRACT

A communication apparatus includes a communicating unit, an identifying unit, and a control unit. The communicating unit has an automatic communication mode for automatically responding to a call from a calling destination and communicating with the destination and a manual communication mode for performing communication in accordance with a manual command from an operator. The identifying unit identifies whether a calling destination is registered. The control unit selects the automatic communication mode or the manual communication mode in accordance with an identification result obtained by the identifying unit.

18 Claims, 4 Drawing Sheets

COMMUNICATION APPARATUS

BACKGROUND OF THE INVENTION

1. Field of the Invention

The present invention relates to a communication apparatus having an automatic receive function.

2. Related Background Art

An example of a conventional communication apparatus of this type is a facsimile apparatus having an automatic receive function. This facsimile apparatus detects a calling signal from a transmitting facsimile apparatus and automatically starts a receive operation. In this case, an image can be received even at night when an operator is absent.

Since the above conventional apparatus can automatically start the receive operation, it unconditionally receives facsimile transmission for fun or advertising facsimile transmission such as direct mail. Therefore, a channel is unnecessarily connected or paper is wasted by such a facsimile transmission.

SUMMARY OF THE INVENTION

The present invention has been made in consideration of the above situation and has as its object to improve a communication apparatus.

It is another object of the present invention to provide a communication apparatus having an automatic receive function in which an incoming call from a predetermined apparatus is automatically received and an incoming call from another apparatus is manually received.

It is still another object of the present invention to manually receive an incoming call from a registered apparatus.

It is still another object of the present invention to manually receive an incoming call from a registered apparatus or a non-registered apparatus while identification of the apparatus is displayed.

The other objects of the present invention will become apparent from the following detailed description of the preferred embodiments.

DESCRIPTION OF THE PREFERRED EMBODIMENTS

An embodiment of the present invention will be described below with reference to the accompanying drawings.

In this embodiment, the present invention is applied to a facsimile apparatus. The present invention, however, can be applied to any communication apparatus having an automatic receive function such as a teletex apparatus.

Figure 1:
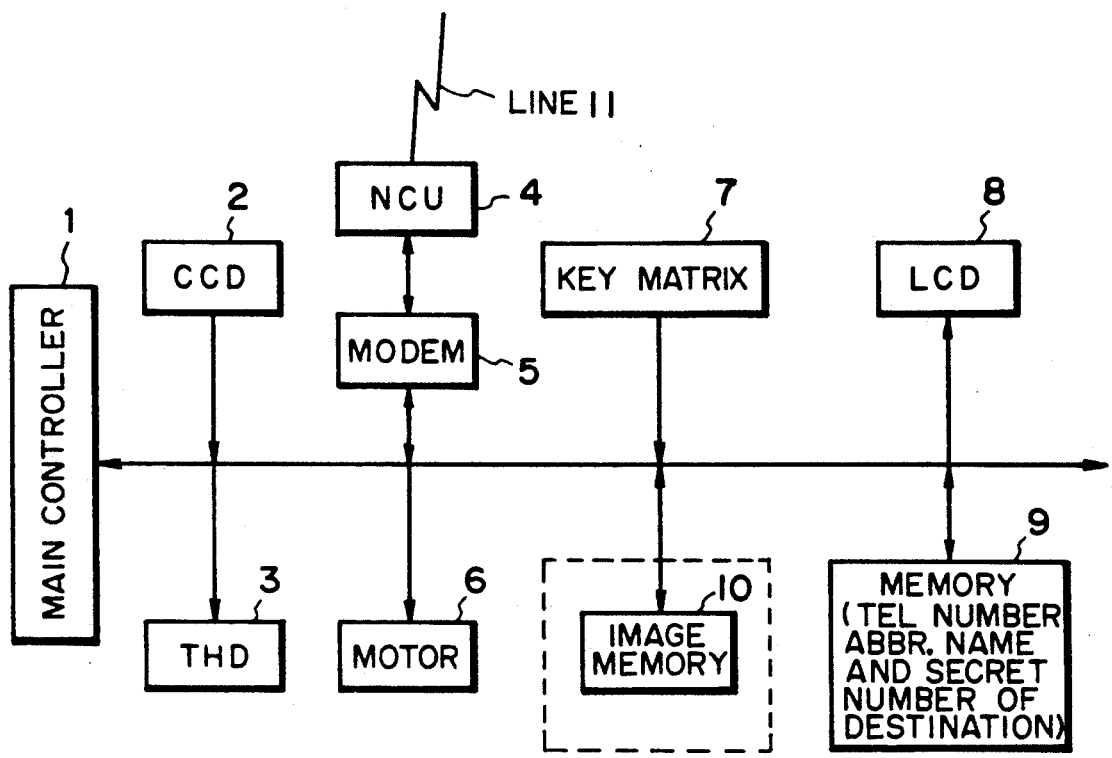
FIG. 1 is a block diagram showing an embodiment of the present invention.

FIG. 1 is a block diagram showing an embodiment of the present invention.

Referring to FIG. 1, a main controller 1 comprises a microcomputer, a read-only memory (ROM) and a random access memory (RAM) and controls each section through an address bus and data bus. A CCD 2 is a reading unit, constituted by a reading element, a binary circuit and the like, for binarizing a read original image. A THD 3 is a recording unit, constituted by a recording head and the like, for recording an image on a recording medium on the basis of image data.

A MODEM 5 demodulates data received from a channel and modulates communication data. A key matrix 7 is constituted by a plurality of key input switches and a key input scanning circuit and is used when an operator inputs a variety of data. An LCD 8 is a display unit, constituted by a liquid crystal display device and the like, for displaying an abbreviation and a telephone number of a destination (an apparatus at the other end during communication) and an input state of an operator. A memory 9 stores a telephone number, an abbreviation, a secret number and the like of a destination. An image memory 10 is also included in the apparatus.

An operation of the above embodiment will be described below.

Figure 2:
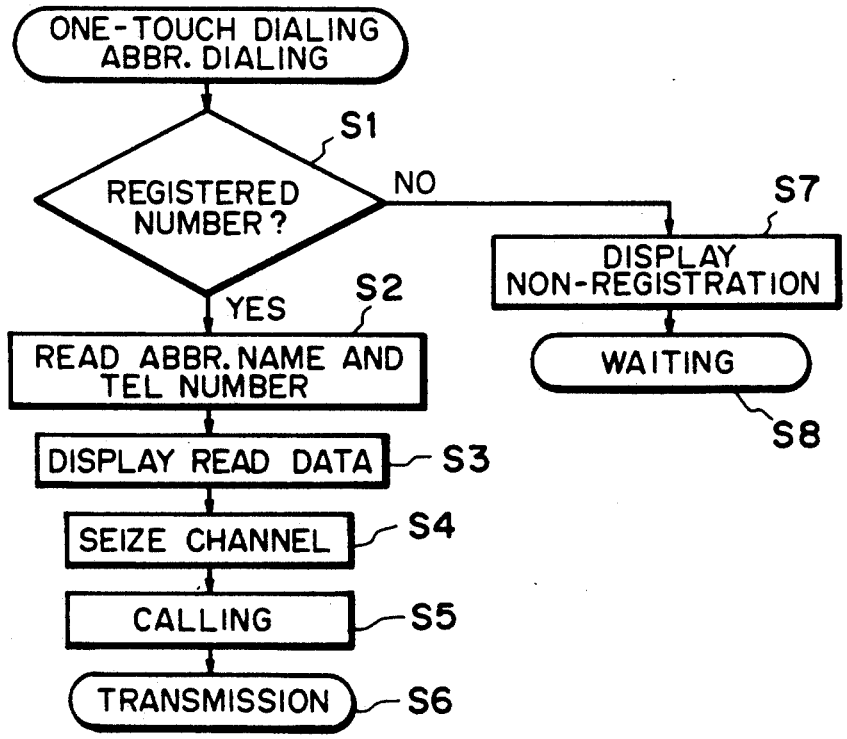
FIG. 2 is a flow chart for explaining an automatic dialing operation.

FIG. 2 is a flow chart for explaining an automatic dialing control operation generally performed by the main controller 1. A control program for executing the control shown in the flow chart of FIG. 2 is stored in the ROM of the main controller 1.

First, the main controller 1 checks whether a telephone number corresponding to a keyed-in one-touch dialing or abbreviation dialing is registered (S1). If the telephone number is non-registered in step S1, this telephone number is displayed (S7), and the flow advances for waiting (S8).

If the keyed-in telephone number is a registered one, in order to send a selection signal and display data, the main controller 1 reads out the telephone number and the abbreviation from the memory 9 (S2), displays the read data (S3), seizes a channel 11 (S4), and performs a call (S5). Thereafter, the main controller performs transmission in accordance with a facsimile transmission sequence recommended by the CCITT (S6).

Figure 3:
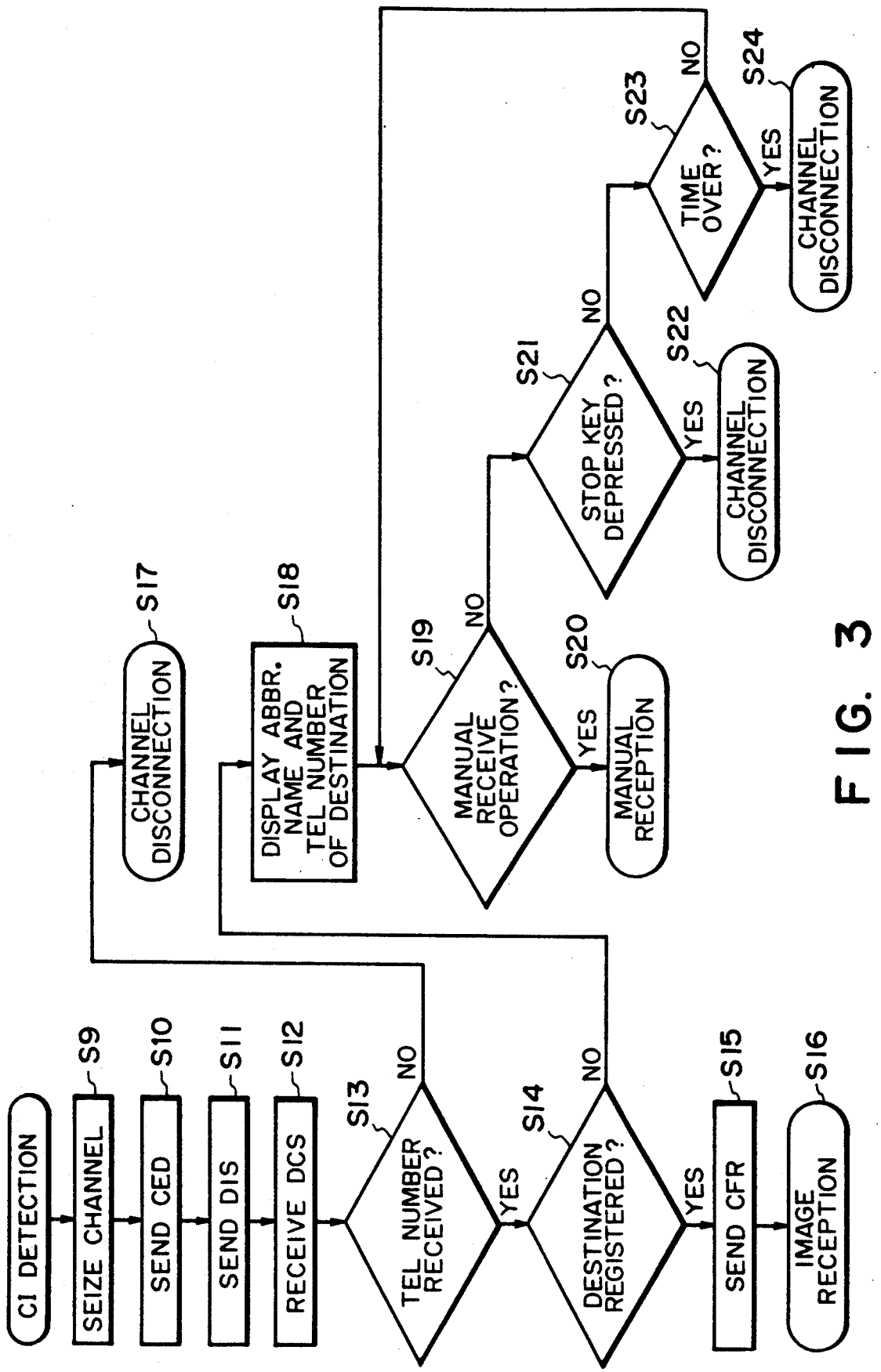
FIG. 3 is a flow chart for explaining a receive operation of the above embodiment.

FIG. 3 is a flow chart for explaining a control operation performed by the main controller 1 upon reception in the above embodiment.

When the main controller 1 detects a CI (Calling Identification) from the channel 11 through an NCU 4, it seizes the channel 11 and responds (S9).

The main controller 1 then sends a CED (Called Station Identification) (S10), sequentially sends NSF (Non-Standard Facilities)/CSI (Called Station Identification)/DIS (Digital Identification Signal) (S11), and receives NSS (Non-Standard Facilities Set Up)/TSI (Transmission Subscriber Identification)/DCS (Digital Command Signal) (S12). Although the main controller 1 then performs operations following recommendation of the CCITT, these operations are omitted from FIG. 3. After the NSS/TSI/DCS are received, the main controller 1 checks whether a telephone number and an abbreviation of a destination apparatus is received (S13). If N (NO) in step S13, the channel is disconnected (S17).

If the telephone number and the abbreviation of the destination apparatus are received, the main controller 1 checks whether the destination is registered (S14). If Y (YES) in step S14, the main controller 1 sends a CFR (Confirmation to Receive) (S15) and executes normal image reception (S16).

If the received telephone number is not registered as automatic dialing registration data, the received telephone number and abbreviated name of the destination are displayed on the LCD 8 (S18). Thereafter, if an operator starts a manual receive operation within a predetermined time period (S19), the main controller 1 continues the operation in a normal manual receive mode (S20).

If a stop key is depressed to command interruption during the operation, the channel is disconnected (S22) to end the communication. If an operation is not performed and the predetermined time interval (timer time) is over (S23), the channel is disconnected to end the communication (S24).

In this manner, since reception of facsimile transmission for fun or advertising facsimile transmission such as direct mail can be prevented, the channel is not unnecessarily connected or paper is not wasted by such a facsimile transmission.

Figure 4:
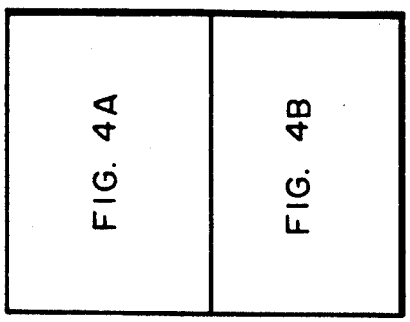
FIGS. 4A and 4b are flow charts for explaining another embodiment of the present invention.
Figure 4B:
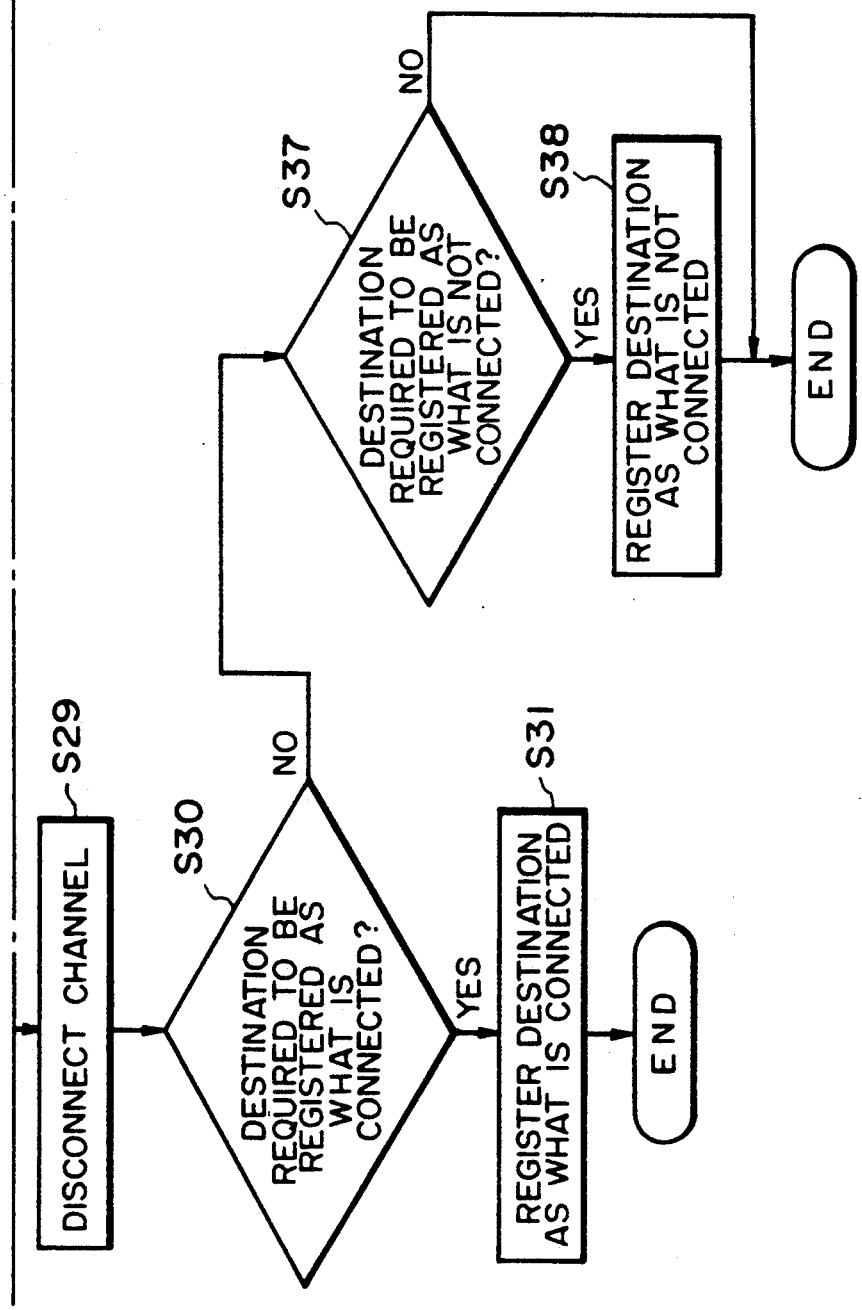
Figure 4A:
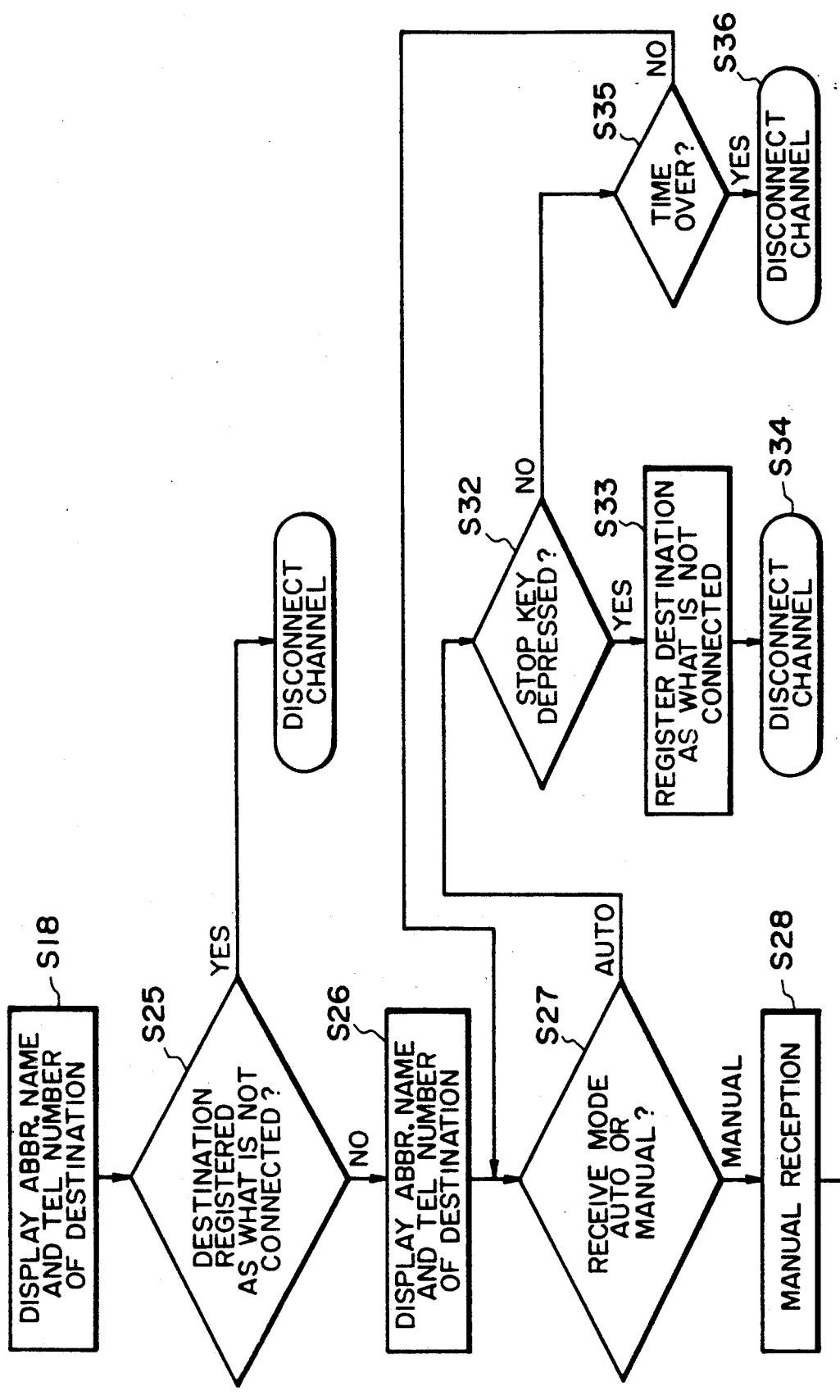

FIG. 4 is a flow chart for explaining another embodiment of the present invention.

In this embodiment, processing performed upon reception from a non-registered apparatus will be described. Processing before step S18 is identical to that before step S18 in FIG. 3. That is, if the destination is registered, a CFR is sent to receive an image (S14 and S16).

In this embodiment, independent of data representing destinations to be connected by one-touch dialing or abbreviation dialing, data representing destinations not to be connected are stored.

If the received telephone number is registered as a destination as what is not connected (i.e., a telephone number of a destination registered as what is not connected) (S25), a channel is immediately disconnected to end the communication.

If the received telephone number is not registered as a destination as what is not connected, the received telephone number is displayed on the LCD 8 to inform an operator of reception (S26). If a receive mode is manual (S27), the operator performs a manual receive operation to perform manual reception (S28). The channel is then disconnected (S29), and a registration mode is started.

That is, if the destination is required to be registered as what is connected as described in FIG. 3 (S30), the destination is registered as what is connected (S31). If the destination need not be registered, the main controller 1 checks whether the transmitting apparatus in manual reception is required to be registered as what is not connected (S37). That is, if a calling destination cannot be identified, the transmission data is manually received. When the operator judges in accordance with the reception data that data from this destination need not be received from the next time, the destination is registered as what is not connected (S38).

If the receive mode is automatic in step S27, the operator checks an abbreviated name and a telephone number of the destination. When the operator judges that data from the destination need not be received, he or she may depress a stop key to stop reception (S32). In this case, the destination is automatically registered as what is not connected (S33), and the channel is disconnected (S34).

If the stop key is not depressed within a predetermined time interval in automatic reception (S32 and S35), the channel is disconnected (S36).

In this manner, when a destination is to be registered as what is connected, registration data for a currently used one-touch key or abbreviation dialing can be directly used without additionally inputting a telephone number. In addition, as shown in FIG. 3, since reception data is utilized to register a destination as connected/not connected, a telephone number or the like need not be additionally input.

According to the present invention as has been described above, in a facsimile apparatus having an automatic receive function, unnecessary channel connection or waste of paper due to facsimile transmission for fun or the like can be effectively prevented.

The present invention is not limited to the above embodiments, but can be variously modified.

What is claimed is:

1. A communication apparatus comprising:
   communicating means performing image communication having an automatic communication mode for automatically responding to a call from a calling destination and communicating with the destination and a manual communication mode for performing communication in accordance with a manual command from an operator;
   identifying means for identifying whether the calling destination is registered; and
   control means for selecting one of the automatic communication mode and the manual communication mode in accordance with identification result obtained by said identifying means.

2. An apparatus according to claim 1, wherein said identifying means comprises memory means for registering communication destinations and for identifying whether the calling destination is registered in said memory means.

3. An apparatus according to claim 2, wherein said control means selects the automatic communication mode when the calling destination is registered in said memory means and selects the manual communication mode when the calling destination is not registered in said memory means.

4. An apparatus according to claim 2, wherein said control means selects the manual communication mode when the calling destination is registered in said memory means and selects the automatic communication mode when the calling destination is not registered in said memory means.

5. An apparatus according to claim 2, wherein said identifying means receives information for identifying the calling destination from the calling destination and identifies in accordance with the received information whether the calling destination is registered in said memory means.

6. An apparatus according to claim 5, wherein said memory means stores telephone numbers, and said identifying means receives a telephone number of the calling destination from the calling destination and identifies whether the received telephone number is stored in said memory means.

7. An apparatus according to claim 1, further comprising display means for displaying the calling destination so that an operator can identify the destination.

8. An apparatus according to claim 1, wherein when said control means selects the manual communication mode, said control means checks whether an operator inputs a communication command within a predetermined time period, and if no communication command is input within a predetermined time period, said control means does not perform communication in response to the call.

9. A communication apparatus comprising:
means for forming a channel loop in response to a call from a calling destination;
communicating means performing image communication having an automatic communication mode for automatically responding to the call from the calling destination and communicating with the destination and manual communication mode for performing communication in accordance with a manual command from an operator.
identifying means for identifying whether the calling destination is registered; and
control means for selecting the automatic communication mode or the manual communication mode in accordance with an identification result obtained by said identifying means,
wherein when said control means selects the manual communication mode, said control means checks whether the manual command is input within a predetermined time period, and if no manual command is input within a predetermined time period, said control means disconnects said channel loop.

10. An apparatus according to claim 9, wherein said identifying means comprises memory means for registering communication destinations and for identifying whether the calling destination is registered in said memory means.

11. An apparatus according to claim 10, wherein said control means selects the automatic communication mode when the calling destination is registered in said memory means and selects the manual communication mode when the calling destination is not registered in said memory means.

12. An apparatus according to claim 10, wherein said control means selects the manual communication mode when the calling destination is registered in said memory means and selects the automatic communication mode when the calling destination is not registered in said memory means.

13. An apparatus according to claim 10, wherein said identifying means receives information for identifying the calling destination from the calling destination and identifies in accordance with the received information whether the calling destination is registered in said memory means.

14. An apparatus according to claim 13, wherein said memory means stores telephone numbers, and said identifying means receives a telephone number of the calling destination from the calling destination and identifies whether the received telephone number is stored in said memory means.

15. An apparatus according to claim 9, further comprising display means for displaying the calling destination so that an operator can identify the destination.

16. A switching method for switching over between an automatic communication mode for automatically responding to a call from a calling destination and performing image communication with the calling destination and a manual communication mode for performing image communication in accordance with a manual command, comprising the steps of:
identifying whether the calling destination is registered; and
selecting one of the automatic communication mode and the manual communication mode in accordance with the identification result obtained in said identification step.

17. A method according to claim 16, wherein said selecting step selects the automatic communication mode when the calling destination is registered and selects the manual communication mode when the calling destination is not registered.

18. A method according to claim 16, wherein said selecting step selects the manual communication mode when the calling destination is registered, and selects the automatic communication mode when the calling destination is not registered.

* * * * *

UNITED STATES PATENT AND TRADEMARK OFFICE
CERTIFICATE OF CORRECTION

PATENT NO. : 5,239,385
DATED : August 24, 1993
INVENTOR(S) : SEISHI EJIRI

It is certified that error appears in the above-identified patent and that said Letters Patent is hereby corrected as shown below:

COLUMN 4

Line 29, "identification" should read --an identification--.

Signed and Sealed this

Fourteenth Day of June, 1994

Attest:

BRUCE LEHMAN

Attesting Officer     Commissioner of Patents and Trademarks